United States Patent [19]

Nozawa

[11] Patent Number: 4,464,628

[45] Date of Patent: Aug. 7, 1984

[54] RELAY TESTER

[75] Inventor: Teruo Nozawa, Hyogo, Japan

[73] Assignee: Mitsubishi Denki Kabushiki Kaisha, Tokyo, Japan

[21] Appl. No.: 318,100

[22] Filed: Nov. 4, 1981

[30] Foreign Application Priority Data

Nov. 7, 1980 [JP] Japan ............................... 55-157442

[51] Int. Cl.³ ........................................ G01R 31/60
[52] U.S. Cl. .............................. 324/418; 324/73 AT; 324/423; 324/424
[58] Field of Search ...................... 73/18, 83 D, 78 D; 307/510, 511; 324/73 R, 73 AT, 140 R, 418, 423, 424; 328/71, 133; 375/14; 377/43

[56] References Cited

U.S. PATENT DOCUMENTS

| | | | |
|---|---|---|---|
| 3,379,898 | 10/1964 | Adler et al. | 328/71 |
| 3,956,623 | 5/1976 | Clark et al. | 328/133 |
| 4,177,419 | 12/1979 | Fiorentzis | 324/73 AT |
| 4,386,430 | 5/1983 | Treiber | 375/14 |

Primary Examiner—Michael J. Tokar
Assistant Examiner—B. J. Kelley
Attorney, Agent, or Firm—Sughrue, Mion, Zinn, MacPeak & Seas

[57] ABSTRACT

In a relay tester, analog signals to be supplied to a relay under test are processed with digital circuits so that the concerned frequency, phase, voltage and current are set and adjusted with high frequency.

8 Claims, 11 Drawing Figures

RELAY TESTER

BACKGROUND OF THE INVENTION

This invention relates to relay testers, and more particularly to a relay tester in which the static characteristic measurement of a relay can be achieved readily by digital control without using measuring instruments such as a frequency meter, a phase meter, a voltmeter or an ammeter.

A typical example of a conventional relay tester of this type is a slidac type relay tester which comprises a voltage transformer, a current transformer and a slidac and uses a variable frequency generator of several kilovolt-amperes (KVA) as a test power source. A second example is an analog type relay tester comprising a low frequency oscillator having a small capacity, an analog phase varying unit, an analog type gain varying unit and a power amplifier.

The analog type relay tester is as shown in FIG. 1, and comprises a low frequency oscillator 1 having an oscillator circuit and a frequency adjusting variable resistor $VR_1$; phase varying units 2 each having a phase shift circuit made up of an operational amplifier and a phase adjusting variable resistor $VR_2$; gain varying units 3 each having a gain varying circuit made up of an operational amplifier and a gain adjusting variable resistor $VR_3$; power amplifiers 4; output conversion circuits 5 which are made up of a tapped voltage transformer and a tapped current transformer, respectively; a frequency meter 6; a voltmeter 7; an ammeter 8; a phase meter 9; and output terminals 10 and 11. In FIG. 1, reference numeral 12 designates a device under test, namely, a relay.

The operation of the analog type relay tester is as follows: The low frequency oscillator 1 generates an analog signal of several volts having a desired frequency. In one of the phase varying units 2, an analog signal of several volts having a desired phase is obtained by using the variable resistor $VR_2$ with the output signal of the oscillator 1 as a reference. In one of the varying units 3, coupled to the one phase varying unit 2, the output signal of the latter 2 is received, and the gain is adjusted to a desired value by using the variable resistor $VR_3$, so that an analog signal of several volts is outputted. The analog signal thus outputted is too small to drive the device 12 under test. Therefore, the analog signal is applied through a power amplifier 4 to an output conversion circuit 5. The output conversion circuit 5 has taps for determining the dynamic range of its output voltage; i.e., it is so designed as to be able to select a desired dynamic range. The output voltage of the output conversion circuit 5 is applied, as a voltage source, to the output terminal 10, the frequency meter 6, the voltmeter 7 and the phase meter 9, and to the device 12 under test.

On the other hand, a current source is provided for the device 12 under test through the output terminal 11 of the lower circuits 2, 3, 4 and 5 which are substantially similar in arrangement to the above-described circuits.

As is apparent from the above description, in order to give a static characteristic test to a relay, it is necessary for the operator to manually set the frequency, phase, voltage value and current value with the variable resistors according to the test items of the relay and to monitor indications on the meters to ensure that the proper signal levels are applied. In other words, since the conventional test is arranged as described above, the operator must manually either coarsely or finely adjust the frequency, phase, voltage value and current value to be applied to the relay with the variable resistors while monitoring the meters, which meters must be very accurate to permit accurate control of the applied values. Such a test method, which depends on the operator's intuition and visual detection, not only contributes to the non-uniformity of products, but also hinders working efficiency.

SUMMARY OF THE INVENTION

Accordingly, an object of this invention is to eliminate the above-described drawbacks accompanying a conventional relay tester. More specifically, this invention provides a relay tester wherein analog signals to be supplied to a relay under test are accurately set and adjusted in a digital mode without using the analog variable resistors which are employed in the conventional relay tester, and wherein the provision of meters for monitoring the applied values is unnecessary.

Provided according to this invention is a relay tester which comprises: a digital frequency varying unit for setting a frequency which is applied to a relay under test; first and second digital phase varying units for varying the phase of a digital output signal of the digital frequency varying unit; first and second function generating circuits for converting digital output signals of the first and second digital phase varying units into analog signals; first and second ditital gain units for varying analog outputs of the first and second function generating circuits to set AC data to be supplied to the relay under test; first and second differential power amplifiers for amplifying analog outputs of the first and second digital gain varying units, respectively; first and second transformer means for converting outputs of the first and second differential power amplifiers into voltage and current, respectively; and a control unit for digitally controlling the first and second digital phase varying units, first and second function generating circuits, first and second differential power amplifiers, and first and second transformer means.

With this construction, the relay tester of the invention is small in size and low in manufacturing cost. Further, with this relay tester, data errors due to personal errors are eliminated, and the working efficiency is improved.

BRIEF DESCRIPTION OF THE DRAWINGS

The nature, principle and utility of the invention will become more apparent from the following detailed description when read in conjunction with the accompanying drawings, in which.

DETAILED DESCRIPTION OF THE INVENTION

Figure 1:
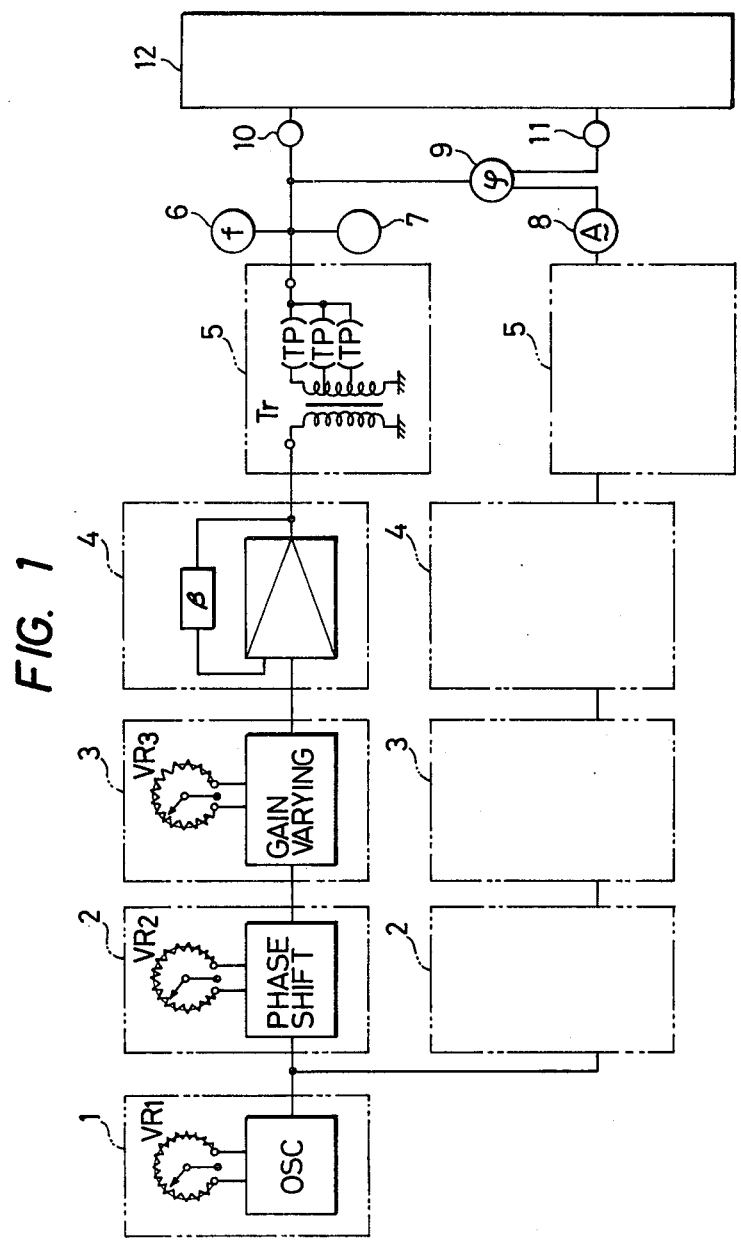
FIG. 1 is a block diagram showing one example of a conventional relay tester.
Figure 2:
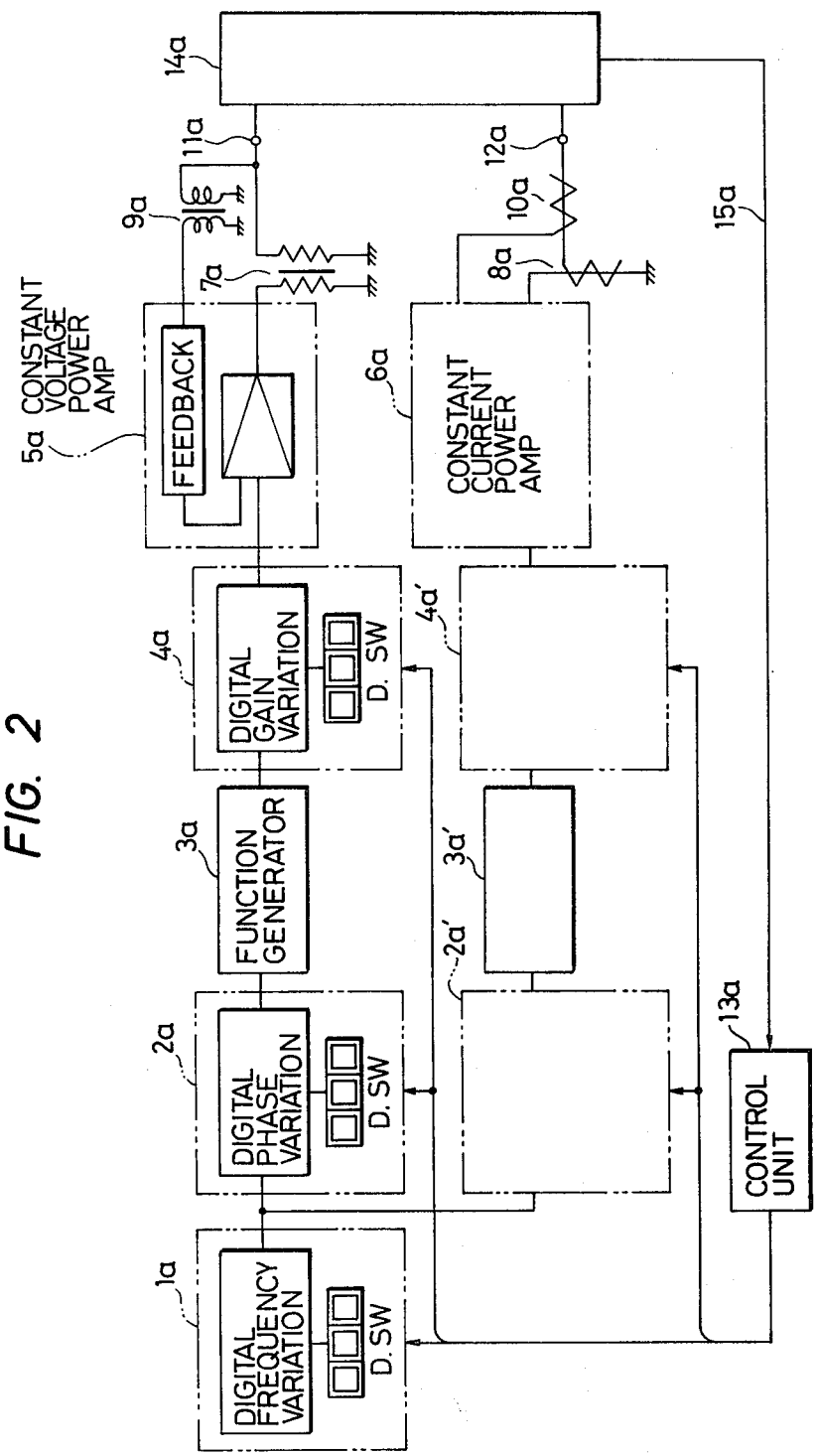
FIG. 2 is a block diagram showing one example of a relay tester according to this invention.

One example of a relay tester according to this invention, as shown in FIG. 2, comprises: a digital frequency varying unit 1a; digital phase varying units 2a, 2a'; function generating circuits 3a, 3a'; and digital gain varying units 4a, 4a'.

Figure 3A:
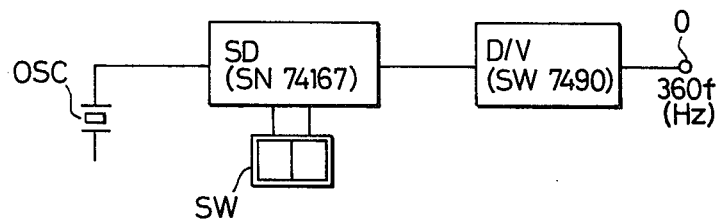
FIG. 3A is a block diagram showing one example of a digital frequency varying unit in FIG. 2.

The digital frequency varying unit 1a, as shown in FIG. 3A, comprises: a crystal oscillator OSC having an oscillation frequency of 3.6 MHz; a synchronous frequency division circuit SD; a frequency division circuit D/V for subjecting a frequency to 1/100 frequency division; and a digital switch DSW for setting a frequency.

Figure 3B:
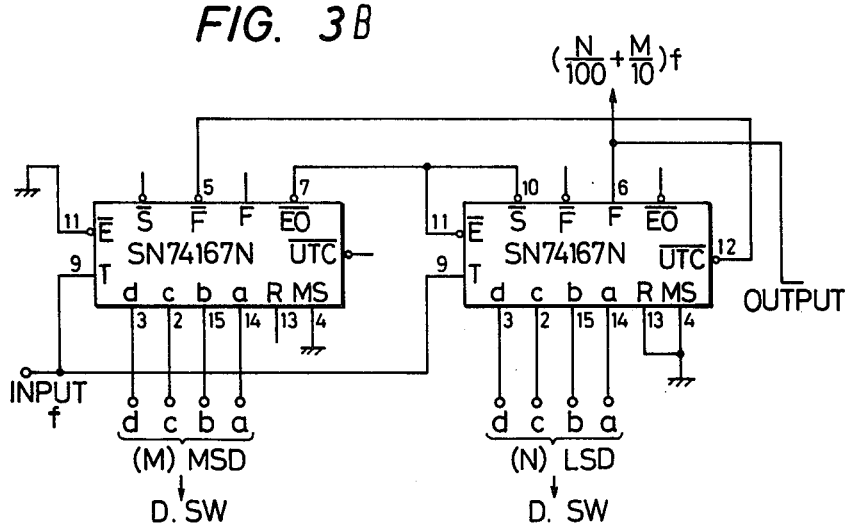
FIGS. 3B and 3C are more detailed diagrams of the components of FIG. 3A.
Figure 3C:
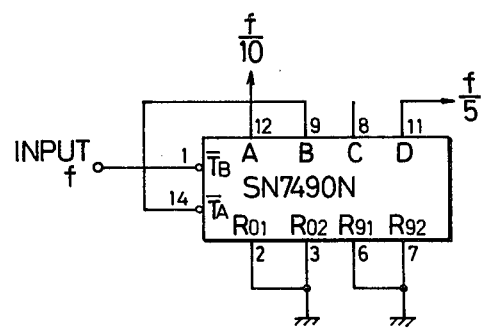

As shown in the more detailed diagrams of FIGS. 3B and 3C, the circuit SD may comprise a programmable frequency division counter which produces a frequency proportional to the digital switch value and is constructed of a pair of SN74167N integrated circuits available from Texas Instruments and the frequency division circuit D/V may comprise a SN7490N integrated circuit also available from Texas Instruments. A plurality of these SN7490N counters coupled in cascade will permit division of, e.g. 1/10, 1/100, 1/1000, etc. The digital switch in the frequency varying unit, as well as the other digital switches in the apparatus of FIG. 2 may be any one of a number of available switches such as a Sum rotary Switch available from Tateishi Electronics Co., Ltd. (OMRON).

Figure 4A:
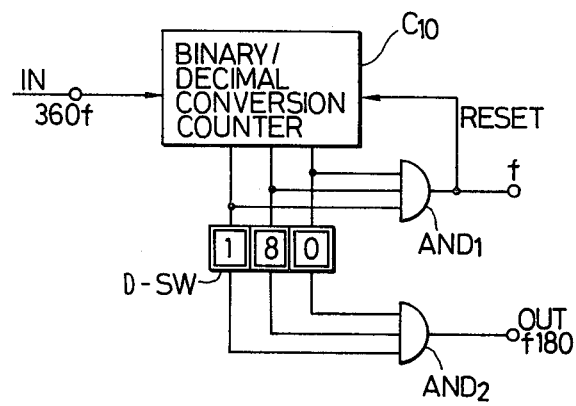
FIG. 4A is a block diagram showing one example of a digital phase varying unit in FIG. 2.
Figure 4B:
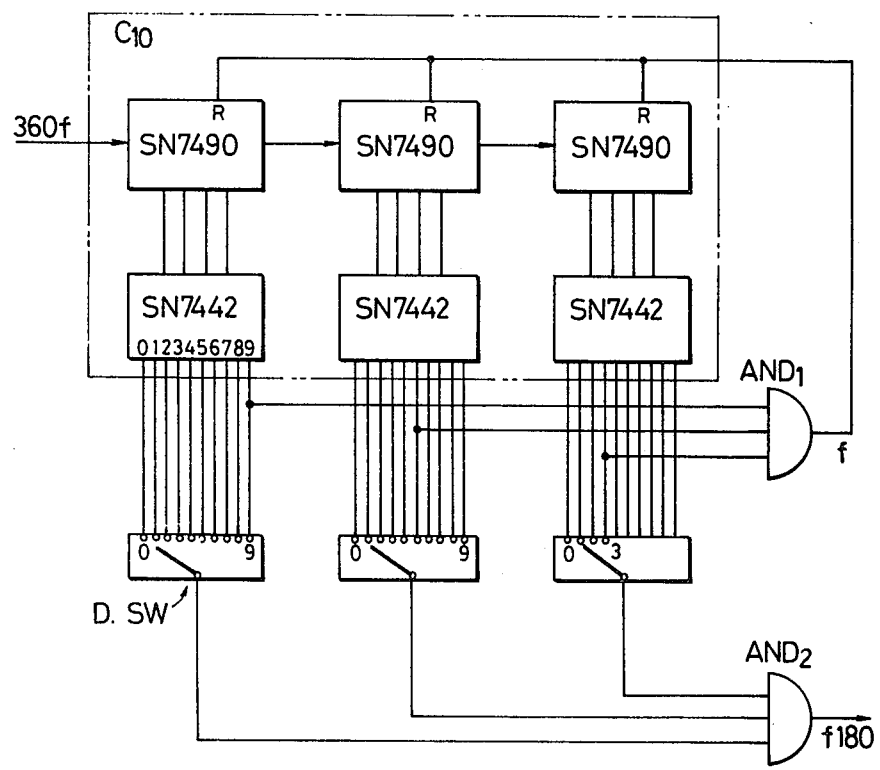
FIG. 4B is a more detailed diagram of the components of FIG. 4A.

Each digital phase varying unit 2a, as shown in FIG. 4A, comprises: a binary-to-decimal conversion counter $C_{10}$; AND elements $AND_1$ and $AND_2$; and a digital switch D.SW. As shown in the more detailed diagram of FIG. 4B, the conversion counter may comprise appropriately connected integrated circuit counters SN7490 and decoders SN7442 both available from Texas Instruments.

Figure 5A:
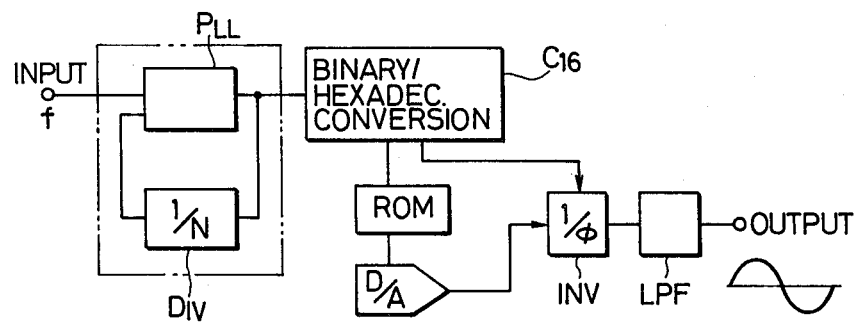
FIG. 5A is a block diagram showing one example of a function generating circuit in FIG. 2.
Figure 5B:
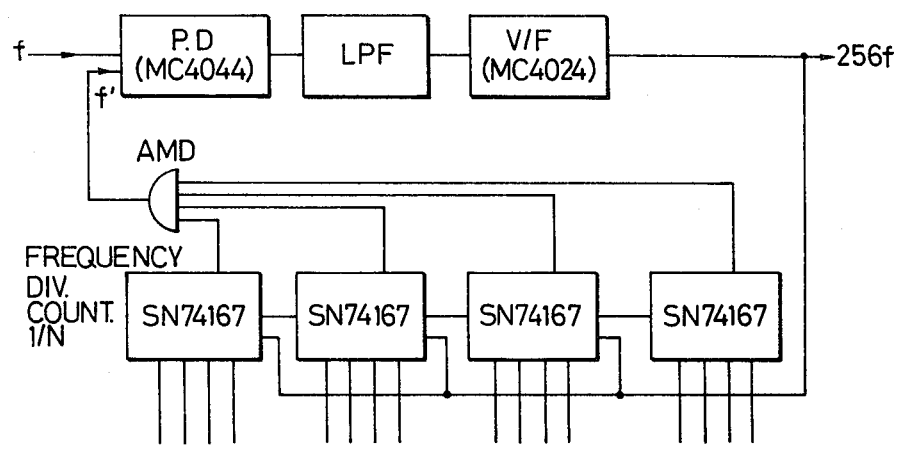
FIGS. 5B and 5C are more detailed diagrams of the components of FIG. 5A.
Figure 5C:
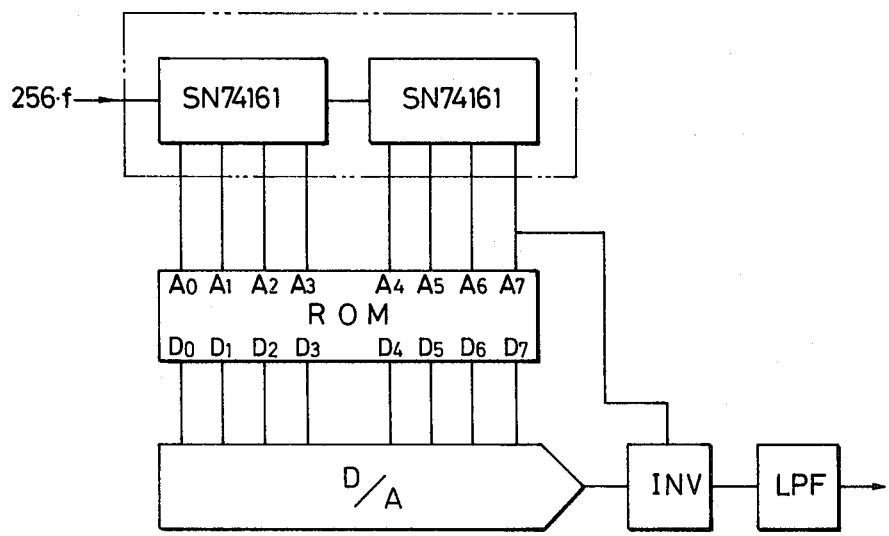

Each function generating circuit 3a, as shown in FIG. 5, comprises: a PLL (phase-locked loop) circuit; a binary-to-hexadecimal conversion counter $C_{16}$; a ROM (read-only memory); a D/A (digital-to-analog) conversion circuit; a LPF (low-pass filter); and a phase inversion circuit INV. As shown in FIG. 5B, the PLL may comprise an MC4044 phase detector and MC4042 V/F converter, both available from Motorola, coupled together through a Low Pass Filter, and the 1/N frequency divider may comprise a plurality of SN74167 integrated circuits available from Texas Instruments. As shown in FIG. 5C, the conversion counter $C_{16}$ may comprise tandem SN74161 circuits available from Texas Instruments.

Figure 6:
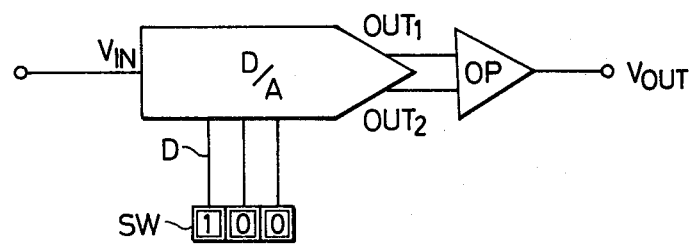
FIG. 6 is also a block diagram showing one example of a digital gain varying unit in FIG. 2.

Each digital gain varying unit 4a, as shown in FIG. 6, comprises: a four-quandrant type digital-to-analog converter D/A; and a digital switch D.SW. The design and operation of D/A converters such as used herein are well known and need not be described in detail.

The relay tester further comprises: a constant voltage power amplifier 5a; a constant current amplifier 6a; a voltage transformer 7a; a current transformer 8a; a power transformer 9a for a high accuracy instrument; a current transformer 10a for a high accuracy instrument; output terminals 11a and 12a; and a digital control unit 13a including, e.g., a microprocessor, memories and a printer.

In FIG. 2, reference character 14a designates a device to be tested, namely, a relay under test; and 15a, an operating signal line.

The operation of the relay tester thus organized will be described with reference to FIGS. 2 through 6. In the frequency varying unit 1a arranged as shown in FIG. 3A, the output signal of the crystal oscillator is of a reference frequency 3.5 MHz. The output signal is applied to the synchronous frequency division circuit SD as a result of which a frequency proportional to a frequency f which is set by the two-digit digital switch D.SW is provided. The frequency thus provided is subjected to 1/100 frequency division in 1/100 frequency division counter. Thus, the output frequency F of the counter D/V may be:

$$F = 3.6 \text{ MHz} \times (f/10^2) \times 1/100 = 360f \text{ (Hz)}$$

The frequency F thus obtained is applied to the binary-to-decimal counter $C_{10}$ in the phase varying unit in FIG. 4A, so that it is converted into a decimal number in a known manner. The output of the counter $C_{10}$ is applied to the AND circuit $AND_1$ which is opened with a decimal number "360". The output of the AND circuit $AND_1$ is applied to the reset terminal of the counter $C_{10}$. Thus, the input signal frequency F (=360f) is divided by 359, and the desired frequency f is obtained at the output of $AND_1$. On the other hand, the output of the binary-to-decimal counter $C_{10}$ is further applied to the AND circuit $AND_2$ through the digital switch D.SW, as a result of which a value set by the digital switch D.SW is provided, as a leading phase signal, by the AND circuit $AND_2$ with the output signal of the AND circuit $AND_1$ as a reference. It goes without saying that, in this case, the frequency is completely equal to the aforementioned value f.

In the function generating circuit, the output signal of the AND circuit $AND_2$ in the phase varying unit is applied to the PLL circuit. The PLL circuit comprises a phase synchronous detector and a V-F (voltage-to-frequency) converter frequency division circuit, which cooperate to multiply an input frequency by a factor of N. The output signal of the PLL circuit, i.e. the multiplied signal, is converted into a hexadecimal number in the binary-to-hexadecimal counter $C_{16}$. The output of the counter $C_{16}$ is applied to the address setting bus of the read-only memory (ROM). The ROM stores hexadecimal representations of discrete portions of half wave components of a sine wave, so that a hexadecimal digital signal is provided at the output of the read-only memory. These hexadecimal digital signals are applied to the D/A converter D/A, as a result of which the half wave of the sine wave is constructed. The half wave signal is applied to the inversion circuit INV which alternately inverts the half sine wave, and to the low-pass filter LPF, to obtain a full sine wave AC signal with a low distortion factor. The inversion signal for the inversion circuit is provided by the most significant bit of the output of the binary-to-hexadecimal counter $C_{16}$.

In the digital gain varying unit, the sine wave AC signal mentioned above is applied, as a reference input signal, to an input terminal $V_{IN}$ of the four-quadrant type digital-to-analog converter D/A. When a digital data "D" is applied to the input data bus of the converter D/A by the digital switch SW, and AC signal $V_{OUT}$ is provided at the output of the operational amplifier OP through the outputs OUT₁ and OUT₂ of the converters D/A. The AC signal $V_{OUT}$ is:

$$V_{OUT} = V_{IN} \times 1/\text{"D"}.$$

The power amplifier 5a is formed as a differential amplifier which receives as a first input the output signal of several volts from the above-described digital gain varying unit 4a, and as a second input the output voltage of the amplifier fed back through the power transformer 9a for a high accuracy instrument. Thus, the input/output relationship of the power amplifier 5a is excellent in linearity. The output of the power amplifier 5a is applied, as a voltage source, to the device under test through the output terminal 11a.

On the other hand, similarly as in the case of the voltage source, a current source is provided for the device under test by the power amplifier 6a with the aid of its preceding digital phase varying unit 2a', function generating circuit 3a' and digital gain varying unit 4a'. The power amplifier 6a is of a power feed-back type. In other words, similarly as in the case of the power amplifier 5a, the output of power amplifier 6a is applied to the feed-back circuit through the current transformer 10a for a high accuracy instrument. Therefore, the power amplifier 6a is also excellent in the linearity of its input-/output characteristic. The output of the power amplifier 6a is applied, as the current source, to the device under test through the output terminal 12a.

With this arrangement, the voltage source and the current source are provided for the device under test through respective output terminals 11a and 12a. These voltage and current values are provided with high accuracy as determined by the digital signals from the digital switches D.SW and the control unit 13a. Therefore, functions equivalent to those of measuring instruments can be obtained by reading the digital signals set, and it is unnecessary to provide high accuracy meters such as a frequency meter, a phase meter, a voltmeter and an ammeter which are required in the conventional relay tester to monitor the applied values. I.e., all that is necessary is to provide relay performance monitoring meters which need not be so high in accuracy.

If a program is stored in advance in the memory circuit of the control unit, then a relay can be tested automatically and quickly. The specific programming needed for the control circuit, which control circuit is only necessary if automatic operation is desired, is obviously quite simple since it merely involves the changing of switch values to desired values. Accordingly, the programming need not be disclosed in detail herein.

The invention has been described with reference to a single phase tester. However, the technical concept of the invention can be equally applied to a multi-phase tester. That is, if the digital type frequency varying unit 1a is commonly used and the other units circuits 2a–12a are provided in as many sets as the number of phases of the polyphase tester, then these other sets of units can all be equally operated with respect to voltage and current but with different phases determined by the digital switch in the units 2a, 2a'.

As is apparent from the above description, according to the invention, the relay tester is so designed that frequency, phase, voltage and current to be applied to a relay are set in a digital mode and supplied as accurately as in the case of measuring instruments. Therefore, it is unnecessary to provide high accuracy measuring instruments, and therefore the relay tester can be manufactured small in size and low in cost. Furthermore, if the device is automatically operated by a microprocessor, data errors attributable to personal errors are eliminated, and therefore the test results are reliable and the work efficiency is improved.

What is claimed is:

1. A relay tester, in which test signals are applied to a relay and wherein various characteristics of said test signals are varied over time, comprising:
   a digital frequency varying unit for generating a digital output signal having a desired frequency determined in accordance with a first digital control signal;
   first and second digital phase varying units for varying the phase of said digital output signal in accordance with a second digital control signal to provide a desired phase thereto;
   first and second function generating circuits for converting digital output signals of said first and second digital phase varying units into respective first and second analog signals;
   first and second digital gain varying units for varying the amplitudes of said first and second analog signals, respectively, to provide desired amplitudes to said first and second analog signals in accordance with respective third digital control signals;
   first and second differential power amplifiers for amplifying analog outputs of said first and second digital gain varying units, respectively;
   first and second transformer means for converting outputs of said first and second differential power amplifiers into voltage and current, respectively; and
   a control unit for digitally controlling said first and second digital phase varying units, first and second function generating circuits, first and second differential power amplifiers and first and second transformer means.

2. A relay tester as claimed in claim 1, further comprising a plurality of sets of first and second digital phase varying units and respective first and second function generating circuits, differential power amplifiers and transformer means, and wherein the output signal from said digital frequency varying unit is provided commonly to each of said sets.

3. A relay tester as claimed in claim 1, wherein said first and second analog signals have said desired frequency and phase.

4. A relay tester as claimed in claim 1, wherein said digital frequency varying unit comprises a digital switch and a programmable synchronous divider programmed by an output from said switch.

5. A relay tester as claimed in claim 1, wherein each of said digital phase varying units comprise:
   digital counter means for receiving said degital output signal;
   conversion means for converting said digital signal to a decimal output;
   reset means for resetting said counter means in response to a predetermined decimal output value; and
   decoder means for providing a signal with said desired phase.

6. A relay tester as claimed in claim 5, wherein each of said digital phase varying units further comprises a digital switch for providing an output signal representing a desired phase, and said decoder means is adjustable in accordance with the value of said second digital switch output.

7. A relay tester as claimed in claim 1, wherein each of said function generating circuits comprises circuit means for providing a digital signal phase locked to the output of said phase varying unit and having a frequency N times the frequency of said phase varying unit output, means for generating an address signal changing at said N times frequency, a memory addressed by said address signal for providing a sequence of outputs at said N times frequency, and D/A conversion means for converting said sequence of outputs into said analog signals.

8. A relay tester as claimed in claim 1, wherein each of said digital gain variation units comprises a digital-to-analog converter for converting a digital value into an analog voltage in accordance with a reference signal, said digital-to-analog converter receiving said function generator output as said reference signal, and a variable digital switch for providing said digital value to said digital-to-analog converter.

* * * * *